United States Patent
Kadono

Patent Number: 5,974,013
Date of Patent: Oct. 26, 1999

[54] DISC REPRODUCING APPARATUS AND HEAD POSITION CALCULATING METHOD

[75] Inventor: Tohru Kadono, Tokyo, Japan

[73] Assignee: Sony Corporation, Tokyo, Japan

[21] Appl. No.: 08/968,975

[22] Filed: Nov. 12, 1997

[30] Foreign Application Priority Data

Nov. 20, 1996 [JP] Japan ................................. 8-309794

[51] Int. Cl.⁶ .................... G11B 3/90; G11B 5/09
[52] U.S. Cl. ................ 369/54; 369/44.28; 369/50
[58] Field of Search .................... 369/30, 32, 33, 369/44.25, 44.26, 44.27, 44.28, 47, 48, 50, 54, 55, 56, 58; 360/75, 78.01, 78.04, 78.14

[56] References Cited

U.S. PATENT DOCUMENTS

| | | | |
|---|---|---|---|
| 5,751,676 | 5/1998 | Kusano et al. | 369/50 |
| 5,805,548 | 9/1998 | Ishihara et al. | 369/58 X |
| 5,881,031 | 3/1999 | Asano et al. | 369/47 X |

*Primary Examiner*—Paul W. Huber
*Attorney, Agent, or Firm*—Limbach & Limbach L.L.P.

[57] ABSTRACT

A disc reproducing device for detecting the position of a reproducing head along the radius of a disc for transferring the head to a targeted radial position on a disc. Since the radial position on the disc in which the optical pickup is positioned can be known prior to actuation of a variety of spindle servo functions, there is no necessity of reading out an address. As compared to a conventional device in which an optical pickup is transferred based on the address reproduced from the disc, access control can be realized more speedily. There is also no necessity of providing a imit switch for detecting the inner peripheral position.

8 Claims, 4 Drawing Sheets

DISC REPRODUCING APPARATUS AND HEAD POSITION CALCULATING METHOD

BACKGROUND OF THE INVENTION

1. Field of the Invention

This invention relates to a disc reproducing device for detecting the position of a playback head along the radius of a disc for transferring the head to a targeted radial position on the disc.

2. Description of the Related Art

There are a variety of disc-shaped recording mediums. Of these, a replay-only optical disc such as a so-called compact disc, and a recordable optical disc capable of not only reproducing information signals but also recording and erasing the information signals, are known extensively.

With a replay-only optical disc, patterns of crests and recesses, that is phase pits, are formed in a spirally extending track or in concentric tracks on one surface of the disc.

The recordable optical discs may be exemplified by an optical disc formed of a phase transition type optical recording material and a magneto-optical disc formed of a perpendicular magnetic recording material.

The magneto-optical disc is made up of a disc substrate of a synthetic resin material, such as light-transmitting polycarbonate or PMMA, having a guide groove formed on its surface for guiding the light beam, a recording layer of the perpendicular magnetic recording material, such as Te, Fe or Co, formed for covering the guide groove, and a protective layer formed for covering the recording layer.

For reproducing the replay-only optical disc, as illustrative of the above-mentioned optical discs, a light beam from a laser light source, converged by an objective lens, is illuminated from the disc substrate side. The information signals recorded on the replay-only optical disc can be obtained by exploiting diffraction of the light beam reflected by the reflective film of the optical disc by the phase pits.

With the latter recordable optical disc, in particular the magneto-optical disc, a light beam from a laser light source, converged by an objective lens, is illuminated from the disc substrate side, as in the case of the above-described replay-only optical disc, and the Kerr rotation angle of the light beam reflected by the recording layer of the optical disc is detected for producing the playback signals in the information signals recorded on the disc.

Meanwhile, the disc management information, such as the so-called table-of-contents (TOC) information, is recorded in a pre-set position, for example the radially innermost area, of the optical disc, such that, directly after loading the disc, this disc management information usually needs to be read.

The following two methods are known as method for reading out the disc management information.

The first method resides in moving the playback head, such as an optical plate, towards the radially inner area of the disc, detecting the head position in the radially innermost area by a limit switch provided in such radially innermost area, feeding the head to a disc management information recording area (TOC area) with the detected position as a reference and adjusting the focusing for reading out the disc management information.

The second method resides in extracting from the playback signal a pre-recorded address (absolute address) along the disc radius of the position assumed by the optical pickup on starting the reproduction and calculating the amount of head movement based on the difference of the extracted address and the address of the TOC area.

The above-mentioned first method is in need of a limit switch and an increased number of components and assembling operations. In addition, the switch mounting accuracy is required, while the switch mounting space is increased.

With the second method, the following sequence of operations need to be carried out before reading out the playback signal from the disc.

First, on starting the reproduction, focusing servo is applied at an area where the optical pickup is located, at the same time that a kick voltage is applied across a spindle motor for rotating the disc.

With the focusing servo thus applied, a tracking-on state is achieved, after which the disc is accelerated or decelerated by speed control for realizing a higher probability of occurrence of the synchronization signal (11T) extracted from the playback signal reproduced from the disc.

In the speed control, the period of the synchronization signal extracted from the playback signal from the disc is compared to the length (11T) of the reference synchronization signal for performing acceleration/deceleration control so that the probability of coincidence of the two will be higher.

The state of the acceleration/deceleration control only is termed a rough servo state.

By carrying out the rough servo, it becomes possible to approach to the rotational speed corresponding to the optical pickup position on starting the reproduction.

By executing both the speed control and the phase control in this state, it becomes possible to capture the desired rotational speed. Under this condition, the phase-locked loop (PLL) is locked. The above-mentioned address can first be read in this locked state of the PLL. In particular, if the optical pickup is positioned in the vicinity of the outer rim of the disc at the time of starting the reproduction, such that the TOC area on the inner rim side of the disc is accessed after reading out the address, the time of at least 3 to 4 seconds elapses.

SUMMARY OF THE INVENTION

It is therefore an object of the present invention to provide a disc reproducing device in which the TOC area can be accessed without using a limit switch and in which the focus-on position can be discriminated before performing the spindle motor capture operation (speed control or phase control) thus enabling quick accessing of the TOC area.

According to the present invention, there is provided a disc reproducing apparatus for reproducing a disc having recorded thereon a digital signal modulated by run-length limited coding in which modulation patterns are changed within a length delimited by the maximum transition length and the minimum transition length. The apparatus includes a motor for rotationally driving the disc, a reproducing head for reading out the digital signal recorded on the disc, a controller for rotating the rotational driving means at a constant speed, a first calculator for calculating an average transition frequency at the prevailing position of the reproducing means from the digital signal read out by the reproducing means under the constant speed rotation, a memory for storing a reference average transition frequency calculated based on a possible pattern of occurrence of the modulation patterns and a second calculator for calculating the prevailing radial position on the disc of the reproducing means based on the average transition frequency at a prevailing position of the reproducing means as calculated by the first processing means and the reference average transition frequency stored in the storage means.

With the disc reproducing apparatus of the present invention, since data is extracted by a reproducing head from an optical disc run in rotation at a pre-set rotational speed, and the prevailing radial position on the disc of the reproducing head is calculated based on the reference average transition value of the data and the transition value of the reproduced data, the prevailing radial position on the disc can be found quickly without reading out the address information for data contents.

By calculating the head transfer amount as far as the target radial position on the disc and by transferring the reproducing head in a corresponding amount, head accessing to the target position can be achieved quickly.

Thus, by setting the TOC position as the target position, the TOC information on loading the disc can be read out quickly without using a limit switch.

DESCRIPTION OF THE PREFERRED EMBODIMENTS

Figure 1:
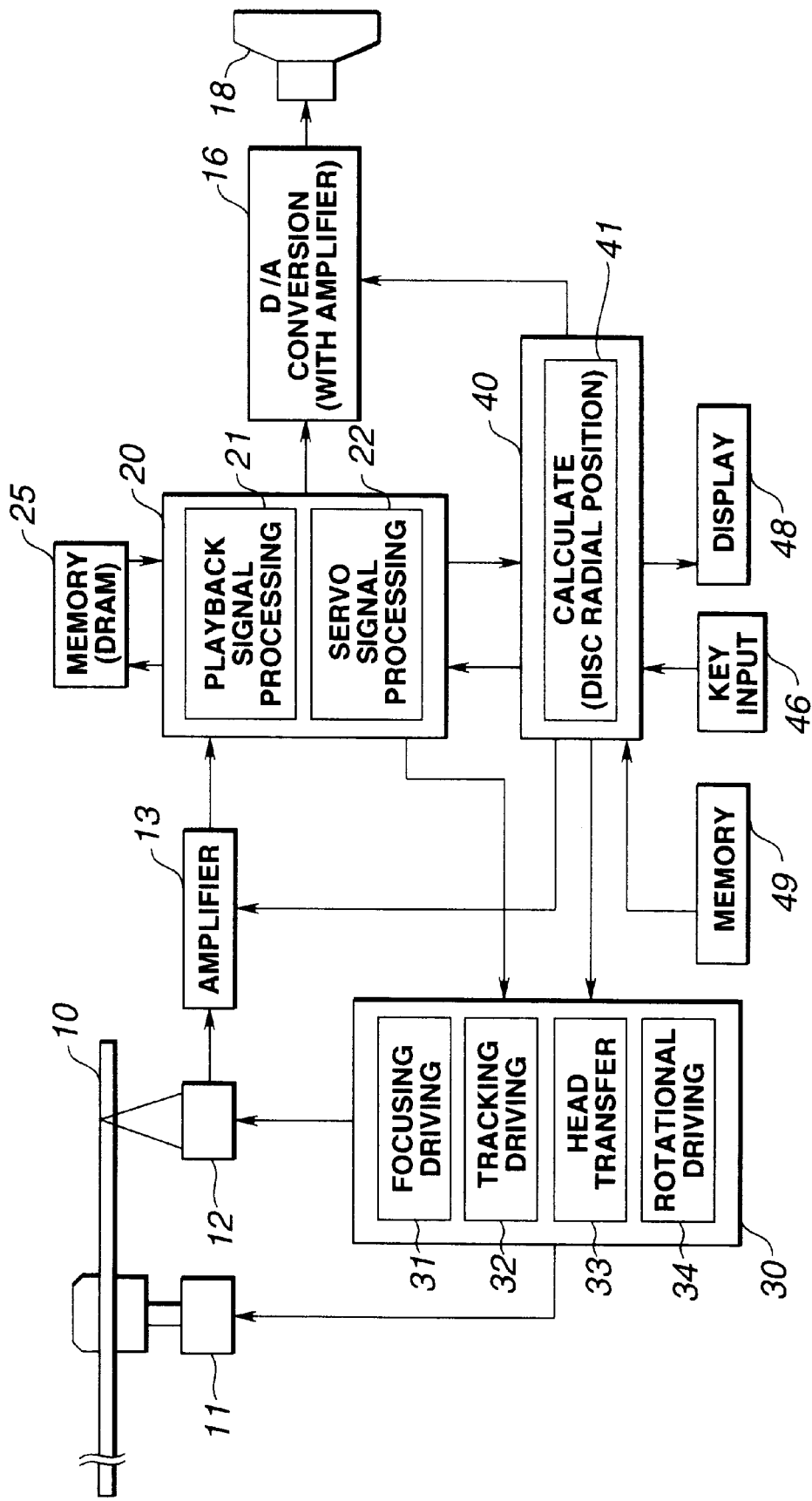
FIG. 1 shows an illustrative disc reproducing device embodying the present invention.

Referring to the drawings, preferred embodiments of the disc reproducing device of the present invention will be explained in detail.

FIG. 1 shows an illustrative disc reproducing device embodying the present invention. In FIG. 1, a replay-only optical disc 10, for example, is run in rotation by a disc driving motor, or a so-called spindle motor 11, for reading out the signal recorded on the optical disc 10 via an amplifier 13 from an optical pickup head 12 as a playback head 12. Playback data obtained on processing the read-out signal by a signal processing circuit 16 is converted by a D/A converter 16 into analog signals which are routed to a speaker 18.

The optical pickup head 12 of the disc reproducing device of FIG. 1 receives the reflected light beam from the optical disc 10 for music playback by a light receiving device split into plural light receiving sections to transmit the signal from the plural light receiving sections to an amplifier (so-called RF amplifier) 13. In this RF amplifier, so-called RF signals, focusing error signals or tracking error signals are taken out and sent to a signal processing circuit 20. The signal processing circuit 20 includes a playback signal processor 21 for reproducing a digital signal and a servo signal processor 22 for processing the servo signals. The playback signal processor 21 of the signal processing circuit 20 reads out data from the RF signal to separate subcode data to send the separated subcode data to a control circuit 40 or decodes main data using a memory 25 such as a DRAM. The servo signal processor 22 of the signal processing circuit 20 outputs focusing control signals or tracking control signals, based on the RF signals, focusing error signals or tracking error signals to transmit the control signals to a driving circuit 30.

The driving circuit 30 includes a focusing driving section 31 for moving the objective lens of the optical pickup head 12 along the optical axis for focusing control, and a tracking driving section 32 for moving the objective lens of the optical pickup head 12 in the tracking direction for tracking.

The driving circuit 30 also includes a head transfer section 33 for moving the optical pickup head 12 along the radius of the disc by so-called threading movement for disc accessing and a rotational driving section 34 for rotationally driving a disc rotating driving motor 11 (spindle motor). These driving sections feed the driving currents to various components responsive to servo control signals from the servo signal processor 22 of the signal processing circuit 20 or to disc accessing control signals from the control circuit 40.

The control circuit 40 is fed with subcode data separated from the playback signal processor 21 of the signal processing circuit 20, part of data from the servo signal processor 22 or key input data from a key input section 46, and transmits various control signals or data to the amplifier 13, D/A converter 16, signal processing circuit 20, driving circuit 30 or to a display section 48.

Figure 2:
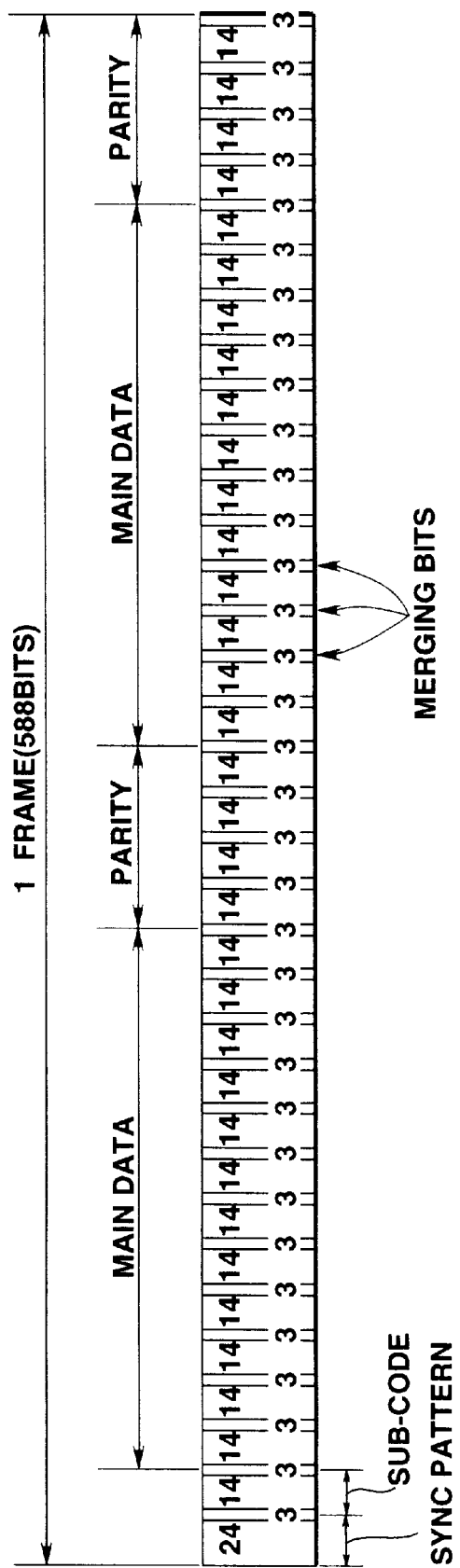
FIG. 2 shows a specified example of encoding data such as audio data with eight-fourteen modulation (EFM).

As an example of the recording format for the optical disc 10 used in the disc reproducing device of FIG. 1, a specified example of encoding data such as audio data with eight-fourteen modulation (EFM) which is a sort of the run-length limited encoding is shown in FIG. 2.

There are stored in a memory 49 a reference average transition frequency F0 as pre-set value for radial position on the disc as later explained and a disc radius R0 as a target TOC position.

In FIG. 2, there is shown a recording format of a frame of a signal modulated in accordance with the above-mentioned EFM. In FIG. 2, there is arrayed, at the leading end of each frame, a pattern having two continuous 11T lengths, each being 11 times a transition length T (=1/4.3218 MHz) of the reference channel bit clocks after modulation, as a so-called out-of-rule sync pattern violating the modulation rule of the EFM. This sync pattern is followed by sub-code data, main data, such as audio data, and parity data. In this data, one-symbol (8-bit) data prior to modulation corresponds to the 14 channel bits after modulation. Between neighboring 14-channel bit data are arrayed 3 channel bits as merging bits.

The frequency of an EFM frame is 7.35 kHz and an EFM frame is made up of 588 channel bits, so that the frequency of the channel bits is 588×7.35 kHz or 4.3218 kHz.

The recording format of FIG. 2 is a format of the so-called compact disc (CD) format. However, it is also used as a format of a system for reproducing CD-ROM signals or compressed audio signals in a small-sized disc with a diameter of 64 mm. In this case, synchronization data or header data is included in 2352 bytes of the main data.

Meanwhile, the modulation rule of the EFM modulation system provides a minimum transition length of 3T, a maximum transition length of 11T and a conversion table of converting 8-bit input data into 256 EFM words of 14 channel bits. If the numbers of times of transitions in each of 256 EFM words are found, the following results are obtained, incorporated by reference in U.S. Ser. No. 08/565,059 filed on Nov. 30, 1995:

| | |
|---|---|
| EFM words having one transition: | 4 words |
| EFM words having two transitions: | 56 words |
| EFM words having three transitions: | 120 words |
| EFM words having four transitions: | 70 words |
| EFM words having five transitions: | 4 words |

From this, the average number of times of transitions of each of the 256 EFM words is $$(1\times4+2\times56+3\times120+4\times70+5\times6)/256=786/256$$

or approximately 3.

The average number of times of transitions in each EFM frame is then found. Referring to FIG. 2, each EFM frame has, in addition to an EFM word of sub-code, 24 EFM words of main data and 8 EFM words of parity, a sync pattern of 11T+11T+3T, that is a pattern with three transitions, and 34 merging bits between the EFM words. If data encoded by EFM is random numbers and the probability of occurrence of transitions in each merging bit is ½, the average number of times of transitions in each EFM frame is (786/256)×33+(½)×34+3 or approximately 121.32. In the above formula, 33 is the total number of words of the sub-code, main data and parity, while 34 is the number of the merging bits and 3 is the number of times of transitions of the sync pattern.

Since the frequency of the EFM frame is 7.35 kHz, as described above, the average frequency of transitions of the EFM signal is (121.32×7.35×10³)/2 or approximately 445.85×10³ or 445.85 kHz. If the main data is close to random numbers, such as compressed data, the average transition frequency of the EFM signal is of a roughly reliable value.

In the present invention, focusing servo is turned on at the current disc radial position and the spindle motor is run in rotation at a pre-set speed. The run-length code is extracted from the playback signal reproduced from the disc and the average transition frequency of the current disc radial position is calculated from the extracted run-length code.

From the average transition frequency in the radial position in the disc assumed currently by the optical pickup and from the average transition frequency based on the pattern of occurrences possible with the EFM system, previously stored in the memory, the radial position on the disc assumed currently by the optical pickup is found.

The above calculations are carried out by a processing functional section 41 in the control circuit 40 of FIG. 1 for calculating e.g., the radial position on the disc. The control circuit 40 controls the head transfer section 33 of the driving circuit 30 by finding the head transfer value based on the current position as found by processing functional section 41 and the address being accessed and controls the optical pickup head 12 of FIG. 1 in a direction along the disc radius in an amount corresponding to the head transfer value thus found for carrying out head accessing to the target position.

Figure 3:
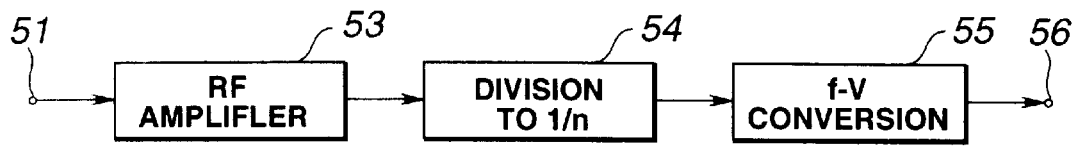
FIG. 3 shows an RF amplifier and related circuitry.

In actually finding the average transition frequency, the playback RF signal, supplied from for example the optical pickup head 12 of FIG. 1 via a terminal 51 is amplified, by an RF amplifier 53 corresponding to the amplifier 13 of FIG. 1, as shown for example in FIG. 3. The amplified signal is frequency-divided to 1/n by a frequency divider 54. The resulting signal is sent to a frequency-to-voltage converting circuit 55 for conversion to a voltage signal representing the frequency. The converted signal is outputted at an output terminal 56. This voltage signal is sent to for example an A/D conversion terminal of a micro-computer employed in e.g. the control circuit 40 of FIG. 1 for conversion to digital data. The average transition frequency can also be found by detecting the edge of the playback RF signal or its frequency-divided output for counting the number of times of transitions by a counter, not shown.

Figure 4:
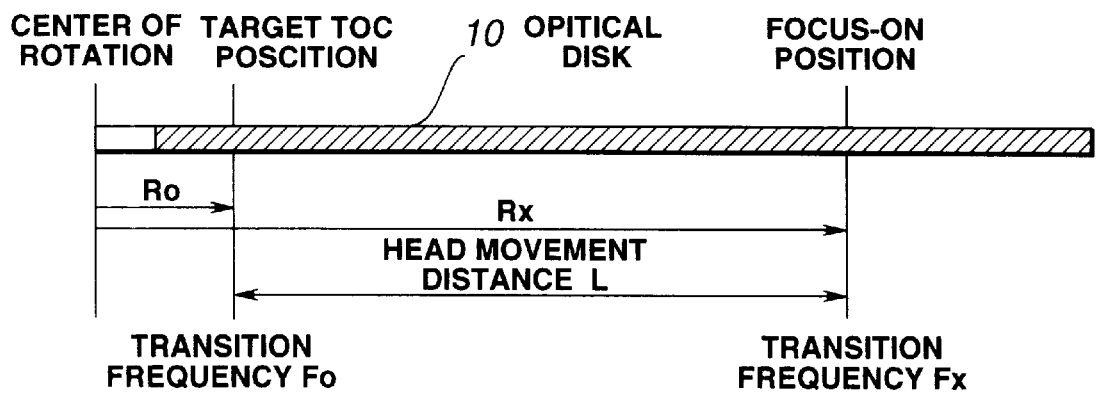
FIG. 4 shows a specified example of encoding data such as audio data with eight-fourteen modulation (EFM).
Figure 5:
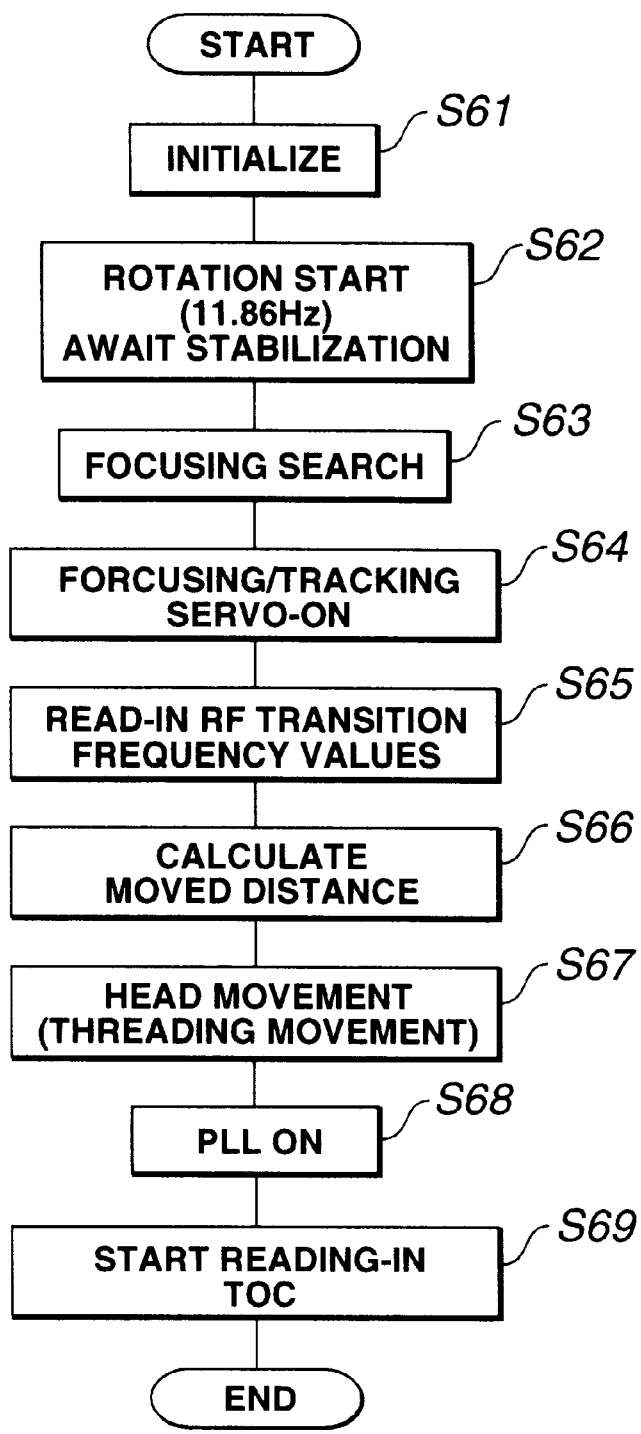
FIG. 5 shows a flowchart for illustrating the above-described head accessing operation.

Referring to FIGS. 4 and 5, an illustrative arrangement in which the target position is the TOC position of the optical disc is explained.

FIG. 4 shows the relation between the radial position of the optical disc 10 on the disc and the values of the transition frequency of the EFM signal obtained as the above-mentioned reproduced EFM signal.

In FIG. 4, the value of the transition frequency at the position of the radial position $R_0$ as the target TOC position on the optical disc 10, that is the value of the frequency divided to 1/n, and the value of the transition frequency at the radial position $R_x$ in which the optical pickup head 12 is positioned in the initial state, with the focusing being turned on, is $F_x$. The optical disc 10 is controlled in rotation to a rotational speed such that a pre-set reference linear speed, such as 1.2 m/s, is reached at the above-mentioned TOC position. The transition frequency at the TOC position $F_0$ is the reference rotational speed of the EFM signal divided to 1/n. If, for example, the frequency dividing ratio 1/n=1/4096, since the average transition frequency of the EFM signal is approximately 445.85 kHz, the reference transition frequency $F_0$ is (445.85×10³)/4096 or approximately 108.85 Hz.

Therefore, since the relation $F_0 \cdot F_x) = R_0 \cdot R_x$ holds, the current head position (the position of the disc radial position $R_x$) can be found by the equation:

$$R_x = R_0 \times F_x / F_0 \tag{1}$$

In this equation, since $R_0$ and $F_0$ are of known values, $R_x$ may be found by substituting the measured value of $F_x$. If the disc radial position $R_x$ where the playback head (optical pickup head 12) is currently located is found in this manner, the amount of head transfer, that is the distance L by which the head is moved along the radius of the disc, may be found by $$L = R_x - R_0 \tag{2}$$

so that the control circuit 40 of FIG. 1 controls the head transfer section 33 of the driving circuit 30 for transferring the head in the disc radial direction by this distance L.

This feeds the playback head to the target TOC position at which the recording on the disc is read out to acquire the TOC information.

FIG. 5 shows a flowchart for illustrating the above-described head accessing operation.

At the first step S61 of FIG. 5, the various circuit portions are initially set responsive to the loading of the optical disc. At the next step S62, rotational driving of the disc is initiated. The rotational speed is such a speed which acquires a pre-set reference linear seed $v_0$ of, for example, 1.2 m/s, at the target TOC position. In the case of the optical disc system of, for example, 6.4 cm in diameter, the TOC position is set to 14.5 mm to 16.1 mm in terms of the disc radial position $R_0$. If $R_0$ is 16.1 mm=16.1×10⁻³ m, the rotational frequency N, given by:

$N = v_0 / (2\pi R_0)$ is approximately 11.86 Hz. Therefore, at step S62, rotation is controlled so that the rotational speed (rotational frequency) will be approximately 11.68 Hz to await stabilization of rotation.

At the next step S62, focusing search is carried out. At the next step S64, focusing servo and tracking servo are turned on.

Then, processing transfers to step S65 to read in the transition frequency of the playback RF signal. The value of the transition frequency is the above-mentioned frequency divided to 1/n, as explained previously.

At the next step S66, calculations for the equations (1) and (2) are executed by the processing functional section 41 of the control circuit 40 of FIG. 1 to find the distance of movement (head transfer amount or distance of movement) L is found. At step S67, the playback head (optical pickup head 12) is moved along the radius of the disc.

At the next step S68, the speed servo and phase servo are turned on for synchronization to the clocks of the playback RF signals for turning on the PLL. The clocks from the PLL are used for rotational control at a constant linear speed and as data read-out clocks. At the next step S69, readout of the TOC data of the prevailing head position is started.

Using this method, head transfer to the TOC position can be realized quickly without using limit switches without reading out the address at the prevailing head position in order to read out the TOC information in a shorter time.

The target radial position on the disc to which the head is transferred is not limited to the above-mentioned TOC position, but may also be any desired radial position on the disc. The initial disc rotational speed need not be set to such speed which assumes a constant value of the linear speed at the TOC position but may also be set to such speed which assumes a constant value of the linear speed at other target radial positions.

In the above-described embodiment, the average transition frequency of the EFM signal is compared to the transition frequency of the playback RF signal in order to find the radial position on the disc. However, the prevailing radial position on the disc may also be found by detecting the frequency in the playback signal for the recording signal containing the pre-set reference frequency component and by comparing the detected frequency to the above-mentioned reference frequency.

In the case of, for example, the recordable optical disc, such as the magneto-optical disc, there is known a technique of wobbling the pre-formed guide groove depending on address data. The wobbling signal of the pre-groove is obtained on modulating address data with a constant carrier frequency. The modulation frequency may be used as the reference frequency.

That is, in reproducing a disc on which signals modulated at the constant modulation frequency have been recorded as a wobbling signal for forming the pre-groove, the modulation frequency component is taken out from the wobbling signal obtained on detecting the pre-groove of the disc, and the reproduced modulation frequency component is compared to the modulation frequency operating as a reference for the modulation frequency recorded on the disc to derive the current radial position on the disc of the playback head. The modulation frequency component can be taken out using, for example, a band-pass filter (BPF). The equation for finding the radial position on the disc is the same as the equation (1). The transfer along the radius of the disc of the playback head based on the distance of head transfer may be found by the equation (2) in the manner described previously.

It should be noted that the foregoing description is merely exemplary since various modification can be attempted without departing from the scope of the invention.

What is claimed is:

1. A disc reproducing apparatus for reproducing a disc having recorded thereon a digital signal modulated by run-length limited coding in which modulation patterns are changed within a length delimited by the maximum transition length and the minimum transition length, comprising:

rotational driving means for rotationally driving the disc;

reproducing means for reading out the digital signal recorded on said disc;

control means for rotating the rotational driving means at a constant speed;

first processing means for calculating an average transition frequency at the prevailing position of the reproducing means from the digital signal read out by the reproducing means under the constant speed rotation;

storage means for storing a reference average transition frequency calculated based on a possible pattern of occurrence of said modulation patterns; and second processing means for calculating the prevailing radial position on the disc of the reproducing means based on the average transition frequency at a prevailing position of the reproducing means as calculated by the first processing means and the reference average transition frequency stored in said storage means.

2. The disc reproducing apparatus as claimed in claim 1 further comprising:

decision means for deciding the amount of transfer of said reproducing means based on the prevailing radial position on the disc of the reproducing means as calculated by said second processing means and on the target radial position on the disc.

3. The disc reproducing apparatus as claimed in claim 2 further comprising:

transfer means for transferring said reproducing means based on the amount of transfer as decided by said decision means.

4. The disc reproducing apparatus as claimed in claim 1 wherein the radial position on the disc which gives the reference average transition frequency is pre-stored in said storage means.

5. A method for calculating the radial position on the disc of a head on a disc having recorded thereon a digital signal modulated by run-length limited coding in which modulation patterns are changed within an length delimited by the maximum transition length and the minimum transition length, comprising the steps of:

rotating said disc at a constant pre-set speed;

turning a focusing servo and a tracking servo on by a reproducing head under the state of rotation at said constant pre-set speed;

calculating an average transition frequency at a prevailing position of the reproducing head from the digital signal read out by said reproducing head;

reading out a reference average transition frequency calculated based on a possible pattern of occurrence of said modulation patterns pre-stored in a memory; and calculating the prevailing radial position on the disc of the reproducing head based on the calculated average transition frequency at a prevailing position of the reproducing head and the reference average transition frequency read out from said memory.

6. The head position calculating method as claimed in clam 5 further comprising a step of;

deciding the transfer amount of the reproducing head based on the calculated prevailing radial position on the disc of the reproducing head and the radial target accessing position of the disc.

7. The disc reproducing apparatus as claimed in claim 6 further comprising the steps of;

transferring said reproducing head based on the decided transfer amount.

8. The head position calculating method as claimed in clam 5 wherein the radial position on the disc which gives a reference average transition frequency is pre-stored in said memory.

* * * * *